(12) United States Patent  (10) Patent No.: US 7,245,151 B2
Baude et al.  (45) Date of Patent: Jul. 17, 2007

(54) LOGIC CIRCUITRY POWERED BY PARTIALLY RECTIFIED AC WAVEFORM

(75) Inventors: Paul F. Baude, Maplewood, MN (US); Michael A. Haase, St. Paul, MN (US); Steven D. Theiss, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/424,450

(22) Filed: Jun. 15, 2006

(65) Prior Publication Data

US 2007/0070661 A1  Mar. 29, 2007

Related U.S. Application Data

(62) Division of application No. 10/738,082, filed on Dec. 17, 2003, now Pat. No. 7,078,937.

(51) Int. Cl.
G06K 19/07 (2006.01)
G06K 7/10 (2006.01)
H02M 7/217 (2006.01)

(52) U.S. Cl. .................. 326/62; 340/572.7; 331/57; 235/472.02

(58) Field of Classification Search .............. 326/62, 326/121, 112, 119, 123; 331/57, 185; 340/572.1, 340/572.7, 568.1; 235/472.02
See application file for complete search history.

(56) References Cited

U.S. PATENT DOCUMENTS 3,870,031 A   3/1975   Krüper
4,570,085 A   2/1986   Redfield
5,173,849 A   12/1992  Brooks et al.
5,534,791 A   7/1996   Mattos et al.
5,701,093 A   12/1997  Suzuki
6,133,835 A   10/2000  De Leeuw et al.
6,329,808 B1 * 12/2001 Enguent .................. 324/76.77
6,433,359 B1  8/2002   Kelley et al.
6,616,609 B2  9/2003   Siskowski et al.
6,667,215 B2  12/2003  Theiss et al.
6,998,068 B2  2/2006   Gerlach
7,088,145 B2  8/2006   Baude et al.
7,098,770 B2 * 8/2006  Charrat et al. ............. 340/10.1
7,109,519 B2  9/2006   Gerlach
2003/0102471 A1  6/2003  Kelley et al.
2003/0150384 A1  8/2003  Baude et al.
2003/0151118 A1  8/2003  Baude et al.
2003/0152691 A1  8/2003  Baude et al.
2003/0175551 A1  9/2003  Smith et al.
2003/0207505 A1  11/2003 Theiss et al.
2006/0214697 A1  9/2006  Baude et al.

FOREIGN PATENT DOCUMENTS

DE   42 30 350 A1   3/1994

\* cited by examiner

*Primary Examiner*—Daniel Chang
(74) *Attorney, Agent, or Firm*—Kent S. Kokko

(57) ABSTRACT

Logic circuitry is powered by a partially rectified alternating current (ac) waveform. The waveform is partially rectified in the sense that it does not provide a clean, primarily dc power signal. Instead, it is possible to power logic circuitry with a waveform that includes a substantial ac component. The partially rectified ac waveform may be applied to logic circuitry incorporating thin film transistors based on amorphous or polycrystalline organic semiconductors, inorganic semiconductors or combinations of both.

15 Claims, 14 Drawing Sheets

LOGIC CIRCUITRY POWERED BY PARTIALLY RECTIFIED AC WAVEFORM

CROSS REFERENCE TO RELATED APPLICATIONS

This application is a divisional of U.S. application Ser. No. 10/738,082, filed Dec. 17, 2003, issued as U.S. Pat. No. 7,078,937, the disclosure of which is incorporated by reference in their entirety herein.

FIELD

The invention relates to logic circuitry and, more particularly, techniques for powering logic circuitry.

BACKGROUND

Thin film circuit devices, including transistors, diodes, and the like, are widely used to form logic circuitry in a variety of modern electronic devices, including integrated circuits, flat panel displays, smart cards, and radio frequency identification (RFID) tags. Thin film circuit devices are formed by depositing, masking and etching a variety of conducting, semiconducting and insulating layers to form a thin film stack.

Typically, thin film transistors (TFTs) are based on inorganic semiconductor materials such as amorphous silicon or cadmium selenide. More recently, significant research and development efforts have been directed to the use of organic semiconductor materials to form thin film transistor circuitry.

Organic semiconductor materials offer a number of manufacturing advantages for transistor fabrication including low processing temperatures. In particular, organic semiconductor materials permit the fabrication of organic thin film transistors (OTFTs) on flexible substrates such as thin glass, polymeric or paper-based substrates.

In addition, organic semiconductor materials can be formed using low-cost fabricaton techniques such as printing, embossing or shadow masking. Although the performance characteristics of OTFTs have improved with continued research and development, device performance and stability continue to present challenges.

SUMMARY

In general, the invention is directed to logic circuitry powered by a partially rectified alternating current (ac) waveform. The waveform is partially rectified in the sense that it does not provide a clean, primarily dc power waveform. Instead, it is possible to power logic circuitry with a waveform that includes a substantial ac component. In fact, the dc component would not be sufficient, on its own, to power the circuit. The invention may be applied to logic circuitry incorporating thin film transistors based on amorphous or polycrystalline organic semiconductors, inorganic semiconductors or combinations of both.

Enhanced stability may permit the use of OTFT circuitry to form a variety of thin film transistor-based logic circuit devices, including inverters, oscillators, logic gates, registers, and other transistor-based logic circuits. Such logic circuit devices may find utility in a variety of applications, including integrated circuits, flat panel displays, smart cards, and circuits. For some applications, powering logic circuitry with a partially rectified ac waveform may eliminate the need for a full wave ac-dc rectification stage.

A partial rectification stage may be realized by a diode, a transistor, or the like, without the need for a filtering capacitor. In this manner, the invention may reduce the manufacturing time, expense, cost, complexity, and size of the component carrying the logic circuitry powered by the partially rectified ac power waveform. With partial rectification both and ac and dc component exist. The ac portion may be quite substantial and the dc portion may be small. The dc portion, in this case, may be insufficient to power a logic circuit by itself. Typically logic circuits require voltages in excess of the threshold voltages of the transistors that make up the logic circuit. In a dc powered circuit, if the dc voltage is less than the threshold voltage, the circuit will not operate. With ac powering it is possible to have the dc component less than the threshold voltage, if the ac component is sufficiently large, and still power the circuit.

The partially rectified ac power waveform directly powers the logic gate circuitry. In particular, the ac power source and partial rectification stage apply a partially rectified ac power waveform to one or more individual logic gates, instead of applying dc power to the logic gates.

The partial rectification stage may include a half-wave or full-wave rectifier with insufficient capacitive filtering to produce a primarily dc power signal as the partially rectified ac power waveform. In this manner, the large filtering capacitor ordinarily provided in a full-wave or half-wave rectification stage can be eliminated or reduced in size so that the overall size of the circuit can be reduced.

Logic circuitry powered by a partially rectified ac power waveform may be used in a variety of electronic devices. As an example, such logic circuitry may be especially useful in applications directed to radio frequency (RFID) tags in which an ac waveform is induced by near-field electromagnetic radio frequency coupling. The ac waveform can be partially rectified to power some or all of the electronic logic circuitry carried by the circuit.

In one embodiment, the invention provides an electronic circuit comprising a first transistor and a second transistor arranged to form a logic gate, an alternating current (ac) source to generate an ac power waveform, and a partial rectification stage to produce a partially rectified ac power waveform from the ac power waveform and directly power the logic gate with the partially rectified ac power waveform. The logic gate may be characterized by a propagation delay. The ac waveform has a period less than the propagation delay, and preferably less than one fifth of the propagation delay.

In another embodiment, the invention provides a method comprising directly powering a logic gate formed by at least a first transistor and a second transistor with a partially rectified alternating current (ac) power waveform produced from an alternating current (ac) power source.

In an added embodiment, the invention provides a radio frequency identification (RFID) tag comprising a logic gate formed by at least a first transistor and a second transistor, a radio frequency (RF) energy coupling device to provide an ac power waveform, and a partial rectification stage that produces a partially rectified ac power waveform from the ac power waveform and directly powers the logic gate with the partially rectified ac power waveform.

In a further embodiment, the invention provides a radio frequency identification (RFID) system comprising an circuit including first and second transistors arranged to form a logic gate, a radio frequency (RF) converter that converts RF energy to an alternating current (ac) power waveform, a partial rectification stage that produces a partially rectified ac power waveform from the ac power waveform and directly powers the logic gate with the partially rectified ac power waveform, and a modulator that conveys information, and an RFID reader that transmits the RF energy to the circuit for conversion by the RF converter, and reads the information conveyed by the modulator.

The invention can provide a number of advantages. For example, the use of a partially rectified ac power waveform to directly power logic circuitry may eliminate the need for a filtering capacitor in a full wave rectifier or half wave component, which is commonly required in many applications for delivery of dc power to the circuitry. Accordingly the use of partially rectified ac power may reduce the manufacturing time, expense, cost, complexity, and size of components carrying thin film transistor circuitry.

For circuits, as a particular example, the use of ac-powered thin film circuitry may substantially reduce the cost and size of the tag by eliminating or reducing the size of many of the components typically associated with an ac-dc rectifier stage, including diode or transistor bridges, and large filtering capacitors. By reducing the complexity of the rectifier stage, thin film logic circuitry powered by a partially rectified ac waveform can result in substantial cost savings and size reductions in the design and manufacture of the circuit.

Additional details of these and other embodiments are set forth in the accompanying drawings and the description below. Other features, objects and advantages will become apparent from the description and drawings, and from the claims.

DETAILED DESCRIPTION

Figure 1:
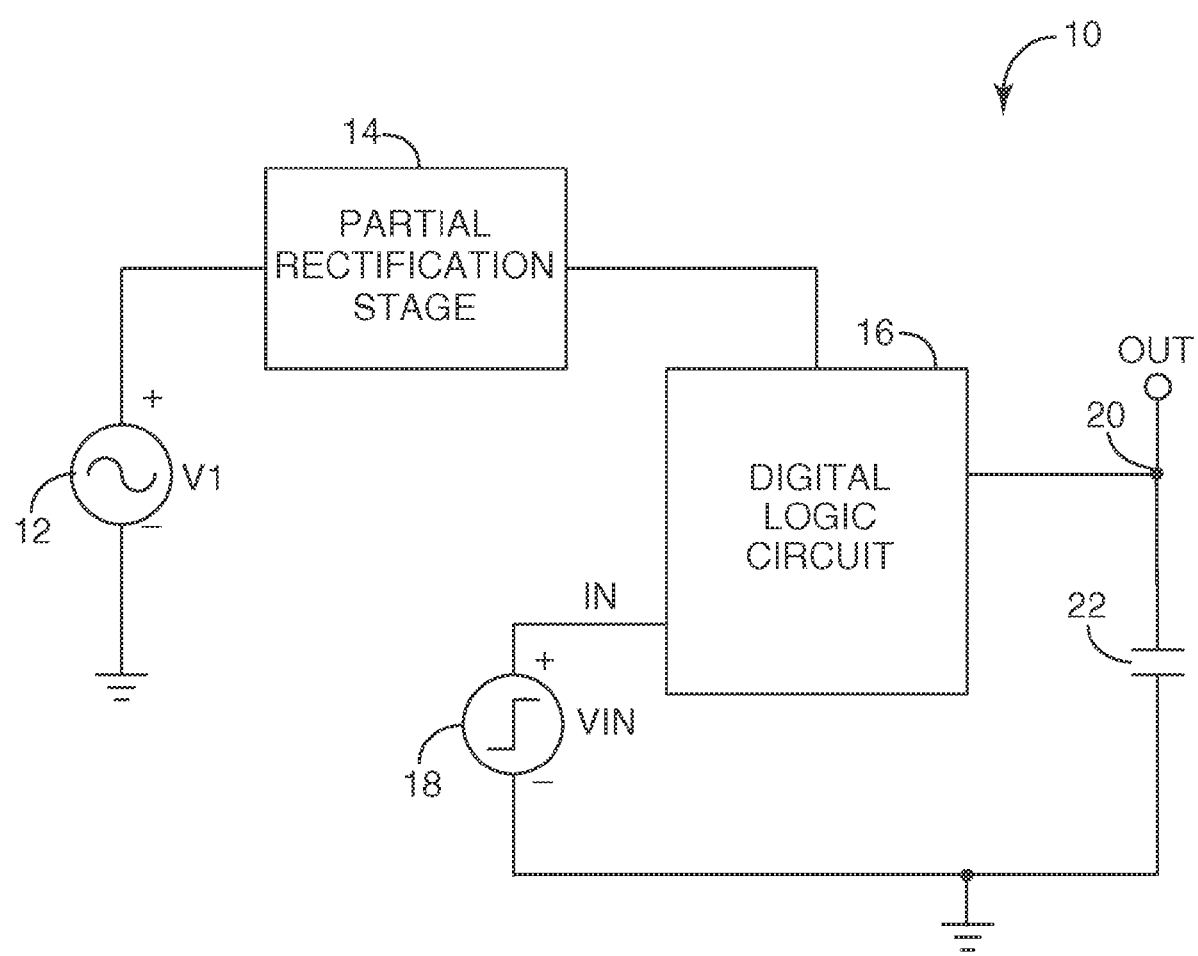
FIG. 1 is a circuit diagram illustrating a digital logic circuit powered by a partially rectified ac waveform.

FIG. 1 is a circuit diagram illustrating a circuit 10 powered by a partially rectified ac waveform. As shown in FIG. 1, an ac power supply 12 delivers an ac power waveform to a partial rectification stage 14. Partial rectification stage 14 partially rectifies the ac power waveform to power a digital logic circuit 16. A signal source 18 drives digital logic circuit 16 with a logic signal. Digital logic circuit 16 produces an output logic signal at output 20. A capacitor 22 may be coupled between output 20 and ground.

The waveform applied to digital logic circuit 16 by partial rectification stage 14 is partially rectified in the sense that it does not provide a clean, primarily dc power signal, as would conventionally be used to power a digital logic circuit. Instead, in accordance with the invention, it is possible to power digital logic circuit 16 with a waveform that includes a substantial ac component.

A partially rectified waveform may be applied, for example, to a digital logic circuit 16 incorporating thin film transistors based on amorphous or polycrystalline organic semiconductors, inorganic semiconductors or combinations of both. The use of a partially rectified ac power waveform to power digital logic circuit 16 can support satisfactory device performance for a variety of applications. For example, when OTFT circuitry is powered by a partially rectified ac power waveform, the OTFT circuitry may exhibit satisfactory performance characteristics even without a dc power signal.

Satisfactory performance without a clean dc power signal may permit the use of TFT circuitry, without the need for full wave rectification circuitry, to form a variety of thin film transistor-based logic circuit devices, including inverters, oscillators, logic gates, registers, or any other transistor-based logic circuit. Such logic circuit devices may find utility in a variety of applications, including integrated circuits, flat panel displays, smart cards, and circuits.

Figure 2:
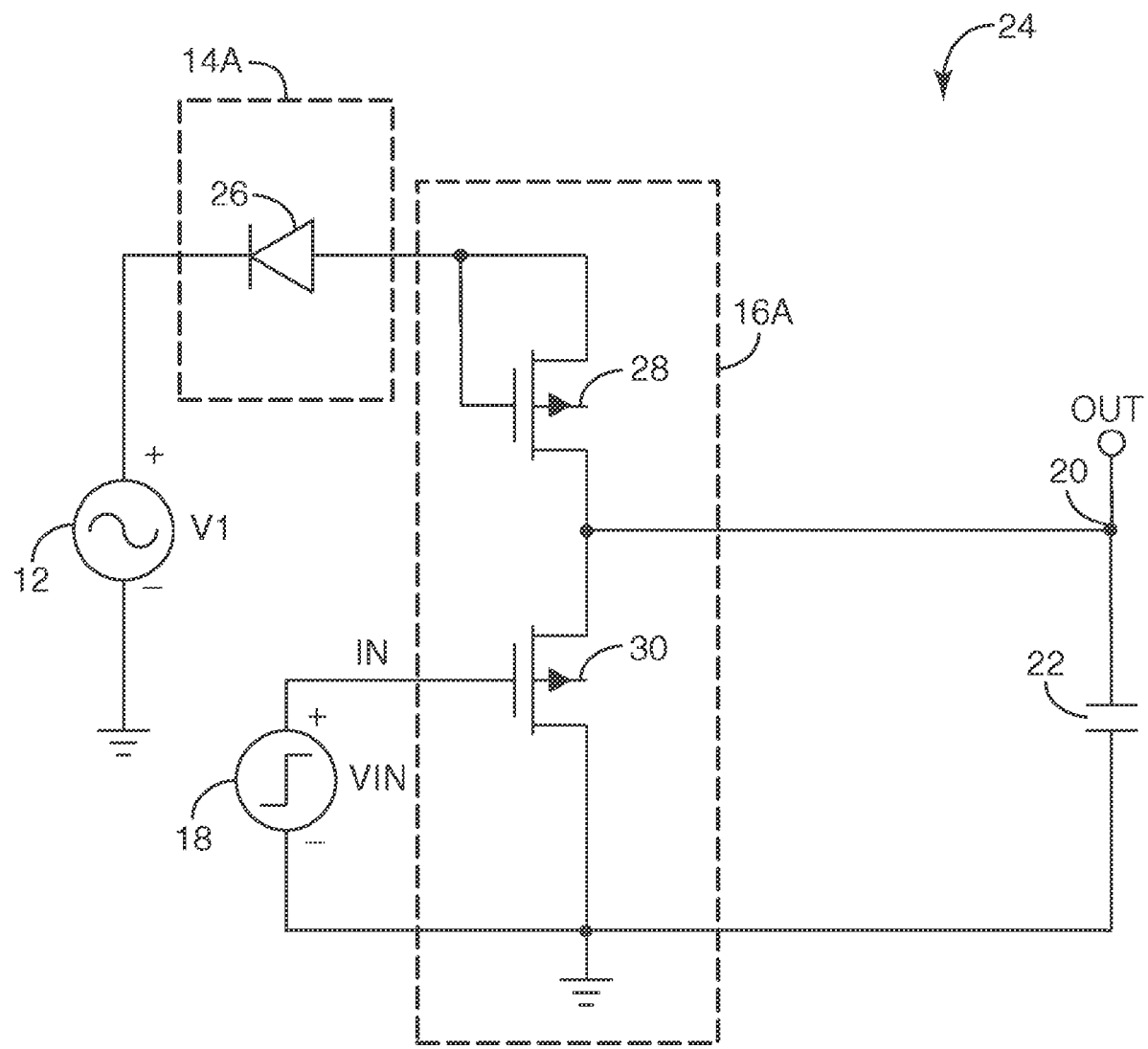
FIG. 2 is a circuit diagram illustrating an inverter circuit powered by a partially rectified ac waveform generated by a half-wave diode-based partial rectification stage.

FIG. 2 is a circuit diagram illustrating an inverter circuit 16A powered by a partially rectified ac waveform generated by a half-wave diode-based partial rectification stage 14A. As shown in FIG. 2, a diode 26 serves to pass only the negative-going half cycles of the ac waveform generated by ac power source 12, and thereby functions as a partial rectification stage 14A. In this example, inverter circuit 16A includes a load transistor 28 and a drive transistor 30. Each transistor 28, 30 may be a thin film field effect transistor (FET), and may be based on an amorphous or polycrystalline inorganic or organic semiconducting material, or a combination of both. A capacitor 22 may be coupled between output 20 and ground.

Useful organic semiconductor materials for forming OTFTs include acenes and substituted derivatives thereof. Particular examples of acenes include anthracene, naphthalene, tetracene, pentacene, and substituted pentacenes (preferably pentacene or substituted pentacenes, including fluorinated pentacenes). Other examples include semiconducting polymers, perylenes, fullerenes, phthalocyanines, oligothiophenes, polythiophenes, polyphenylvinylenes, polyacetylenes, metallophthalocyanines and substituted derivatives. Useful bis-(2-acenyl) acetylene semiconductor materials are described in copending application U.S. Ser. No. 10/620027, filed on Jul. 15, 2003, which is herein incorporated by reference. Useful acene-thiophene semiconductor materials are described in copending application U.S. Ser. No. 10/641730, filed on Aug. 15, 2003, which is herein incorporated by reference. Useful inorganic semiconductor materials for forming thin film transistors include amorphous silicon, polysilicon, tellurium, zinc oxide, zinc selenide, zinc sulfide, cadmium sulfide, and cadmium selenide.

As an alternative, digital logic circuit 16A may be formed by a combination of organic and inorganic semiconducting material, e.g., to form a complementary metal oxide semiconductor (CMOS) inverter circuit. For example, in some applications, inverter circuit 16A may be formed by an n-channel metal oxide semiconductor (NMOS) inorganic field effect transistor (FET) and a p-channel metal oxide semiconductor (PMOS) organic field effect transistor (FET). When OTFTs are used, transistors 28, 30 may be especially adaptable to fabrication using low cost fabrication techniques, and may be formed on flexible substrates for some applications.

The ac power source 12 directly applies an ac power waveform to diode 26, which applies a partially rectified waveform, in the form of a series of alternating half cycles of the ac waveform, to inverter circuit 16A. In some embodiments, a filtering capacitor may be provided between the cathode of diode 26 and ground. However, the filtering capacitor may have insufficient capacitance to produce a fully rectified, substantially dc waveform. Rather, diode 26 produces only a partially rectified ac waveform that is applied directly to inverter 16A.

In this manner, inverter 16A receives only a partially rectified ac power waveform instead of a dc power waveform. In other words, inverter 16A operates in response to the partially rectified ac power waveform. Accordingly, intervening circuitry may exist between ac power source 12, diode 26 and inverter 16A provided that the inverter still receives only a partially rectified ac power waveform as operating power, rather than a dc power signal. In the example of FIG. 1, the partially rectified ac power waveform is applied directly across the common gate and drain connection of load transistor 28 and the ground connection coupled to the source of drive transistor 30.

Figure 3:
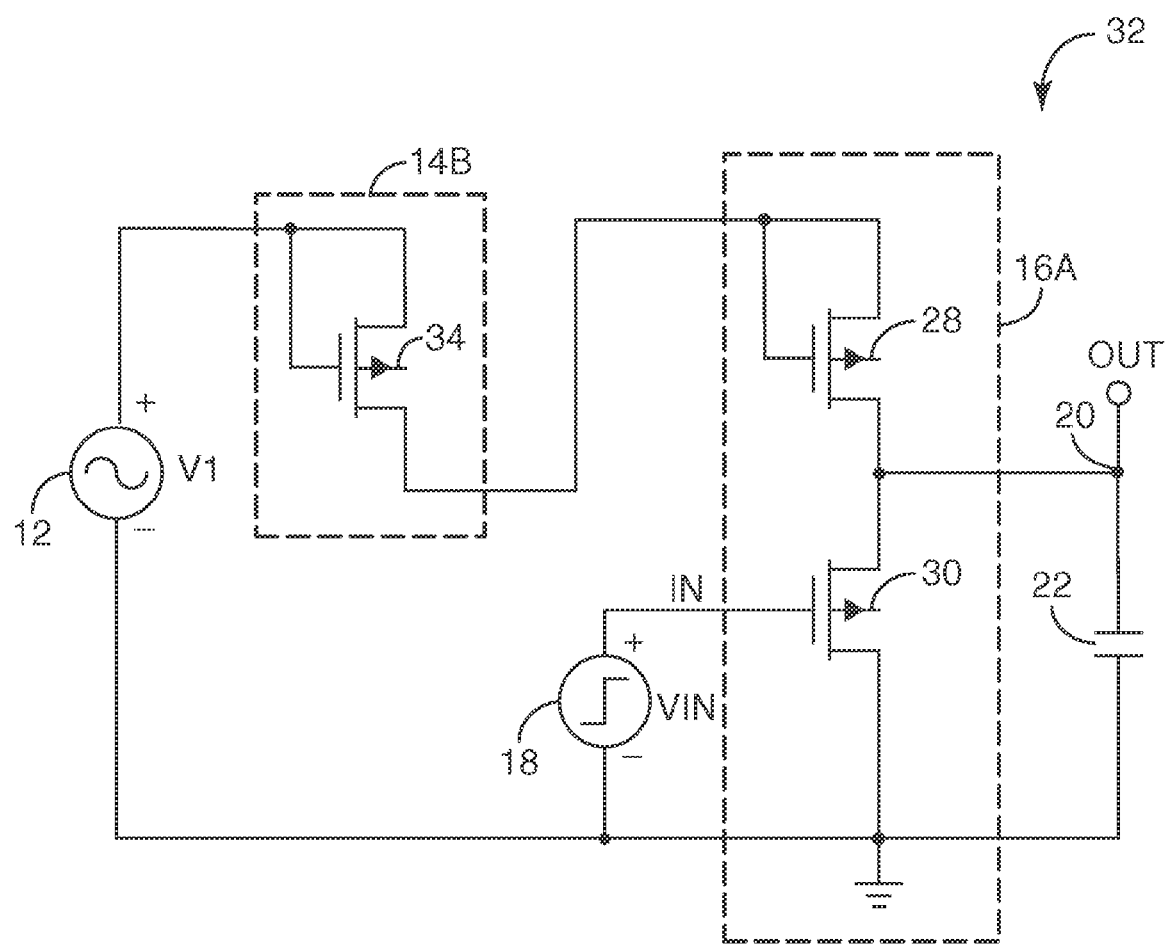
FIG. 3 is a circuit diagram illustrating an inverter circuit powered by a partially rectified ac waveform generated by a half-wave transistor-based partial rectification stage.

FIG. 3 is a circuit diagram illustrating an inverter circuit 16A powered by a partially rectified ac waveform generated by a half-wave transistor-based partial rectification stage 14B. As shown in FIG. 3, partial rectification stage 14B includes a transistor 34. The gate and drain of transistor 34 are coupled in common to the positive terminal of ac power supply 12. The source of transistor 34 is coupled to create an output node for partial rectification stage 14B. The output node of partial rectification stage 14B is coupled to both the gate and drain of load transistor 28 of inverter circuit 16A. Hence, the circuit of FIG. 3 substantially corresponds to the circuitry of FIG. 2, but includes a transistor-based partial rectification stage 14B. Transistor 34 may be a thin film field effect transistor (FET), and may be based on an amorphous or polycrystalline inorganic or organic semiconducting material, or a combination of both.

Again, the use of a partially rectified power waveform to power thin film transistor-based logic circuitry, such as inverter 16A in FIGS. 2 and 3, can support satisfactory device performance for a variety of applications, while enhancing long-term stability of the circuitry. For example, when inverter 16A is powered by a partially rectified ac waveform, the inverter may exhibit satisfactory performance characteristics relative to dc-powered inverters. Also, operation of inverter 16A with a partially rectified ac waveform eliminates the need for an ac-dc full wave rectification stage.

As shown in FIG. 3, the gate and drain of load transistor 28 are coupled to receive the partially rectified ac waveform produced by partial rectification stage 14B. In particular, the gate and drain of load transistor 28 are both coupled to the source of transistor 34. The drain of drive transistor 30 is coupled to the source of load transistor 28, and the source of the drive transistor is coupled to ground. Signal source 18 generates a logic signal to drive the gate of drive transistor 30.

In response, inverter 16A produces an inverted output 20, which may be output across a load capacitor 22. Load capacitor 22 may serve to filter out some of the ac voltage present at the inverted output 20 and provides for a cleaner output logic signal. The amount of filtering depends on the capacitance of load capacitor 22 and the frequency of the ac power. Load capacitor 22 may be formed by an input capacitance produced by gate/source overlap within a logic gate coupled to output 20 in the event inverter 16A is coupled to drive one or more additional logic gates.

The gate/source overlap may be controlled during manufacture of a drive transistor in a subsequent logic gate to produce a desired level of capacitance in load capacitor 22. Alternatively, load capacitor 22 may be formed independently, particularly if output 20 does not drive another logic gate.

In some embodiments, load transistor 28 may have a gate width to gate length ratio that is greater than or equal to a gate width to gate length ratio of the drive transistor 30. In this case, direct current (dc) powering of the circuit could result in inferior operation of the logic gate, for NMOS or PMOS designs, because of the reduced gain. NMOS or PMOS ring oscillators based on this design, for example, would be unstable. An added benefit of having the gate width to gate length ratio of load transistor 28 greater or equal to the gate width to gate length ratio of drive transistor 30 is that the total circuit area is reduced.

Notably, although the inverted output 20 may be filtered by load capacitor 22, the input power waveform applied to inverter 16A generally is not. In particular, the partially rectified ac waveform produced by partial rectification stage 14B is not filtered to an extent sufficient to produce a primarily dc signal for inverter 16A. Rather, the partially rectified waveform produced by partial rectification stage 14B includes a substantial ac component.

In some embodiments, a relatively small filtering capacitor may be coupled between the source of transistor 34 and ground, but the capacitance is generally insufficient to entirely filter out variation in the partially rectified waveform due to non-rectified portions of the ac power waveform produced by ac power supply 12. In particular, portions of the partially rectified waveform that are coincident with the non-rectified negative half cycles produced by ac power supply 12 will still present substantial variation in partially rectified waveform. In this manner, the large filtering capacitor ordinarily provided in a full-wave or half-wave rectification stage can be eliminated or reduced in size so that the overall size of the circuit or electronic device can be reduced.

Figure 4A:
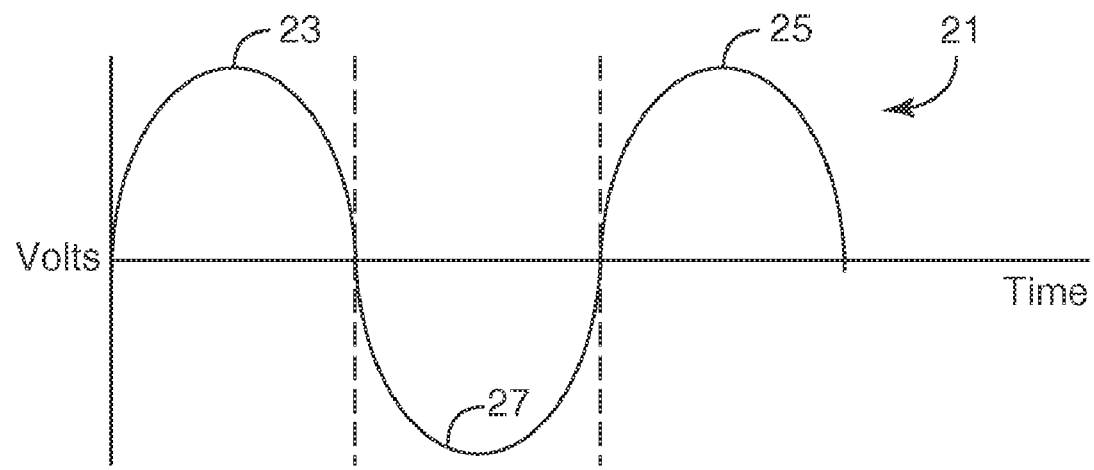
FIGS. 4A, 4B and 4C are graphs conceptually illustrating an ac power waveform and exemplary partially rectified ac power waveforms.
Figure 4B:
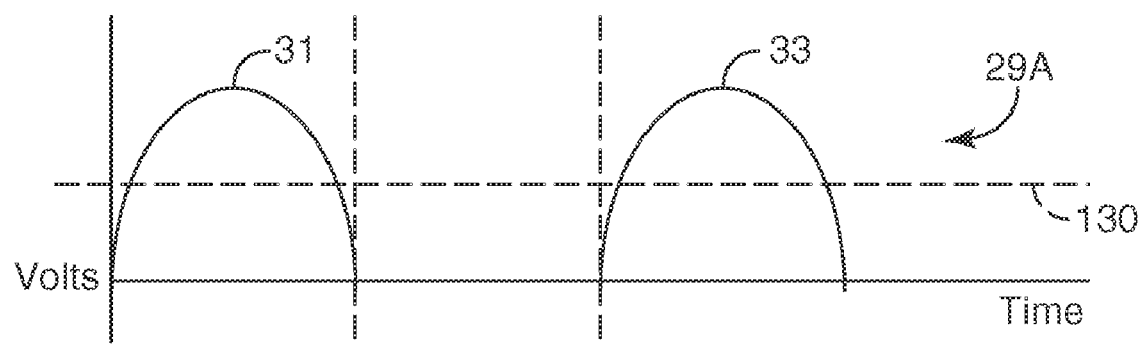
Figure 4C:
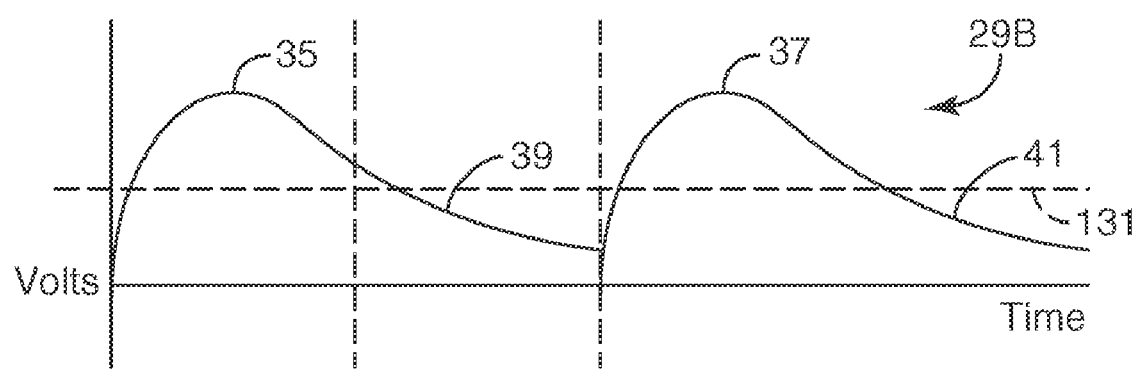

FIGS. 4A, 4B and 4C are graphs conceptually illustrating an ac power waveform and exemplary partially rectified ac power waveforms. FIG. 4A depicts an ac power waveform 21 produced by ac power supply 12. As shown in FIG. 4A, the ac power waveform is substantially sinusoidal and includes positive half cycles 23, 25 and negative half cycles 27. In accordance with the invention, a partial rectification stage 14 partially rectifies the ac power waveform 21 to produce a partially rectified ac waveform, e.g., as depicted in FIGS. 4B or 4C.

In the example of FIG. 4B, partial rectification stage 14 produces a partially rectified ac power waveform 29A, essentially by half-wave rectification without sufficient capacitive filtering to produce a primarily dc signal. Instead, partially rectified ac power waveform 29A includes positive half cycle 31 and positive half cycle 33, but eliminates any negative half cycles and drops to a reference voltage level. Hence, according to the example of FIG. 4B, partial rectification stage 14 may include substantially no capacitive filtering. As a result, the partially rectified waveform 29A essentially preserves, in half cycles 31, 33, the waveform characteristics of the positive half cycles 23, 25 of the ac power waveform 21. Line 130 represents the average dc voltage, and is insufficient to power the circuit.

In the example of FIG. 4C, partial rectification stage 14 produces a partially rectified ac power waveform 29B with positive half cycles 35, 37. In addition, partial rectification stage 14 may include a limited amount of capacitive filtering that creates an exponential tail off 39, 41 following each half cycle 35, 37. The peaks of half-cycles 35 and 37 represent sufficient voltages to power the circuit. The capacitive filtering, in some embodiments, may be provided by a capacitor placed between an output of partial rectification stage 14 and ground. As shown in FIG. 4C, the capacitance is insufficient to produce a primarily dc power signal. Rather, the partially rectified waveform 29B may preserve a substantial ac component of the original ac power supply waveform 21 (FIG. 4A) produced by ac power supply 12. Line 131 represents the average dc voltage, and is insufficient to power the circuit.

For some applications, powering a logic circuit 16 with a partially rectified ac waveform eliminates the need for a full wave or half-wave ac-dc rectification stage that produces a dc component sufficient to power the circuit. Instead, a power source may include a relatively simple partial rectification stage 14. As illustrated in FIGS. 2 and 3, a partial rectification stage 14 may be realized by a diode, a transistor, or the like, without the need for a large filtering capacitor. In this manner, the invention may reduce the manufacturing time, expense, cost, complexity, and size of the component carrying the logic circuitry powered by the partially rectified ac power waveform.

Logic circuitry powered by a partially rectified ac power waveform may be used in a variety of electronic devices. As one example, such logic circuitry may be especially useful in applications directed to radio frequency (RFID) tags in which an ac waveform is induced by radio frequency coupling. The ac waveform can be partially rectified to power some or all of the electronic logic circuitry carried by the circuit. By eliminating circuitry ordinarily required by a full-wave or half-wave rectifier, including the sizable capacitor often used with a half-wave rectifier, the size of the circuit may be significantly reduced. Similar size reductions may be achieved in other types of electronic devices.

Figure 5:
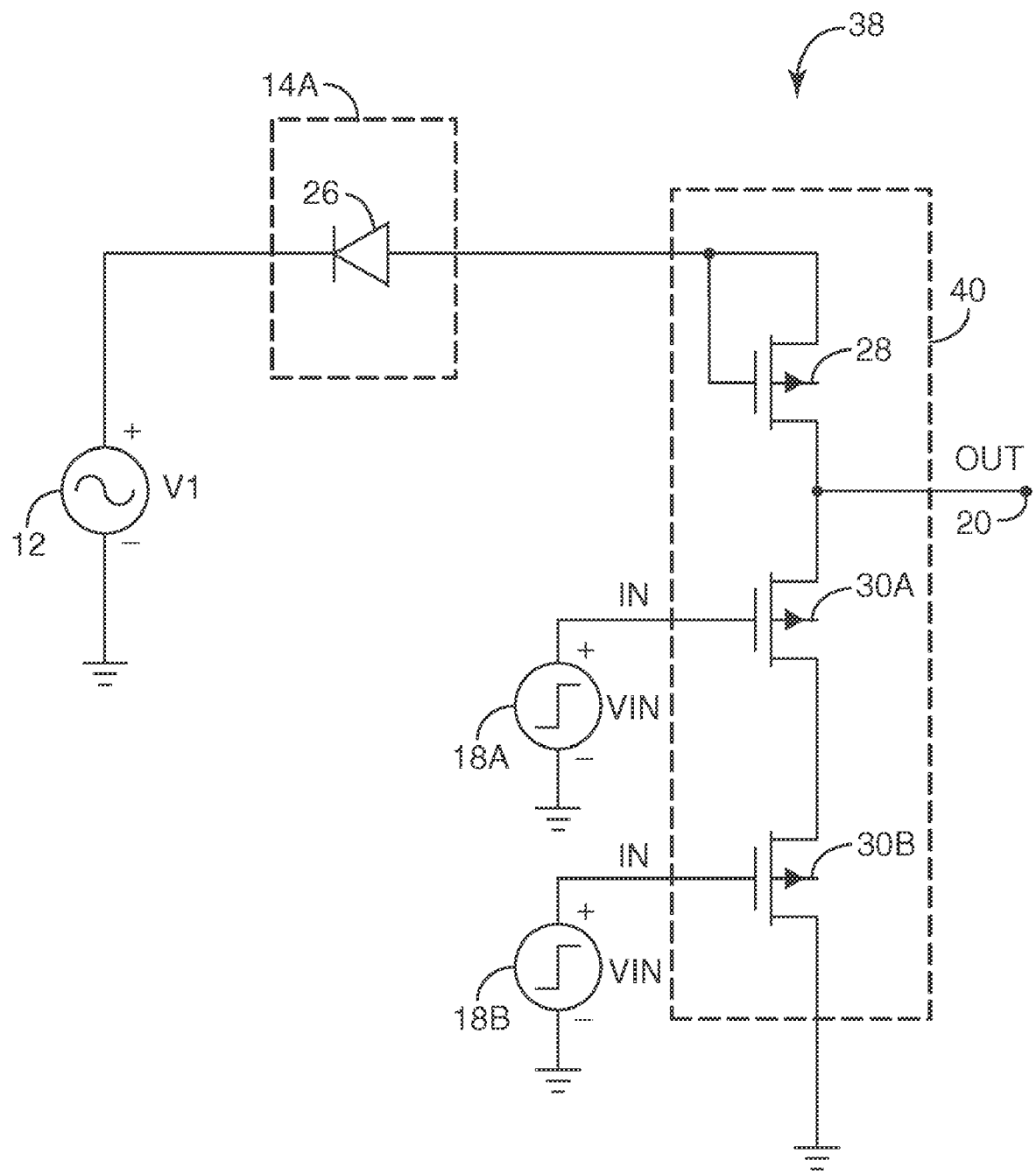
FIG. 5 is a circuit diagram illustrating a NAND gate circuit powered by a partially rectified ac waveform generated by a half-wave diode-based partial rectification stage.

FIG. 5 is a circuit diagram illustrating a thin film transistor-based NAND gate circuit 38 powered by a partially rectified ac waveform generated by a half-wave diode-based partial rectification stage 14A. As shown in FIG. 5, a NAND gate 40 includes a load transistor 28 and drive transistors 30A, 30B. The gate and drain of load transistor 28 are coupled to the output of partial rectification stage 14A, which includes a diode 26.

The drain of first drive transistor 30A is coupled to the source of load transistor 28. The drain of second drive transistor 30B is coupled to the source of first drive transistor 30A. The source of second drive transistor 30B is coupled to ground. First and second signal sources 18A, 18B drive the gates of drive transistors 30A, 30B, respectively. In response, transistors 28, 30A, 30B form a NAND gate 40 that produces a logical NAND output 20.

NAND circuit 40 of FIG. 5 is operative in response to the partially rectified ac power waveform produced by diode 26. In particular, the partially rectified ac power waveform is coupled directly to NAND gate 40. In some embodiments, a load capacitor may be coupled across output 20. The load capacitor may be formed independently or realized by the input capacitance of a logic gate driven by output 20 of NAND gate 40. Also, a filtering capacitor may be placed between the cathode of diode 26 and ground, provided that the resulting capacitance is insufficient to produce a primarily dc power signal.

Figure 6:
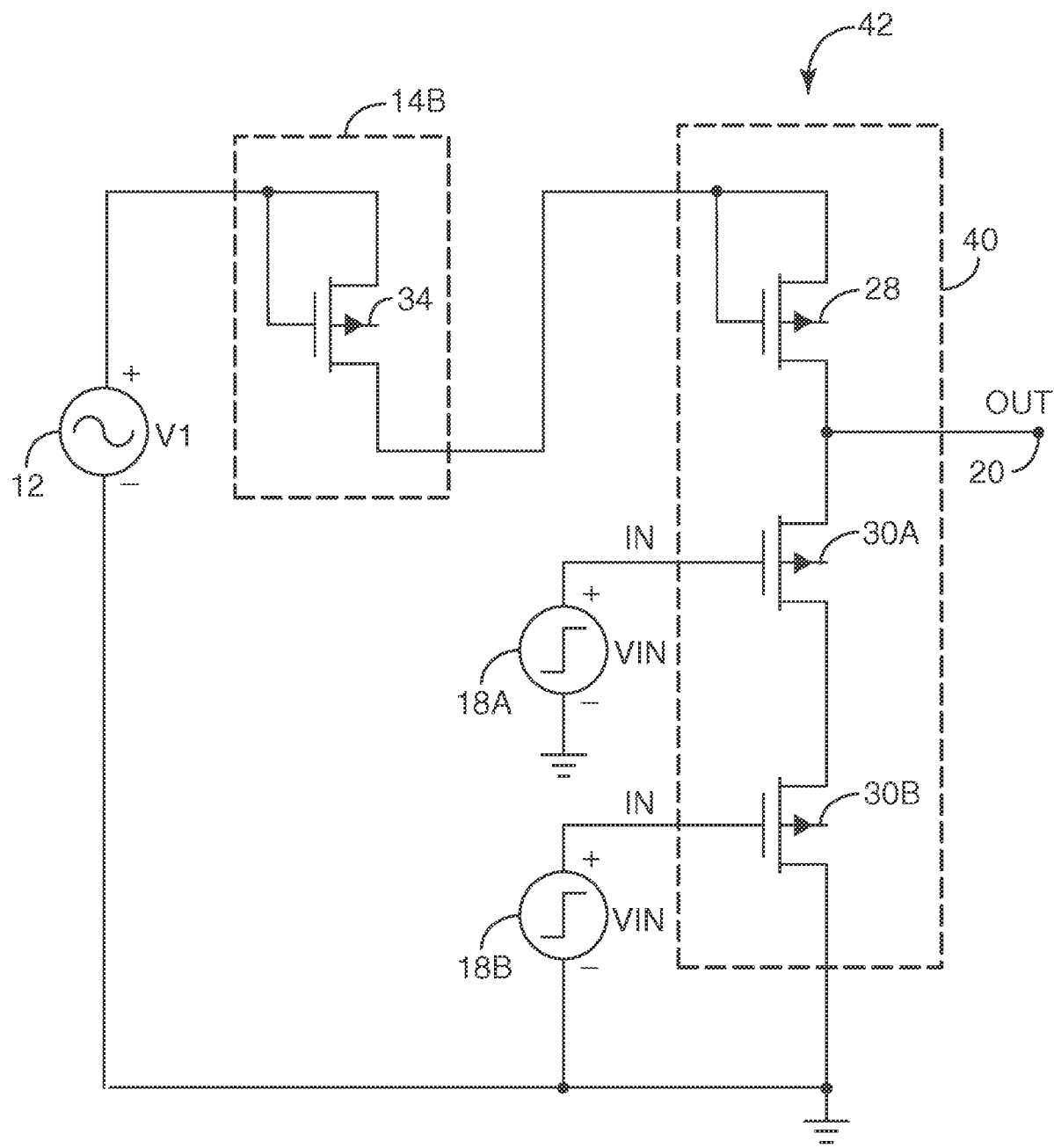
FIG. 6 is a circuit diagram illustrating a NAND gate circuit powered by a partially rectified ac waveform generated by a half-wave transistor-based partial rectification stage.

FIG. 6 is a circuit diagram illustrating a NAND gate circuit 42 powered by a partially rectified ac waveform generated by a half-wave transistor-based partial rectification stage 14B. NAND gate circuit 42 includes NAND gate 40 and corresponds substantially to NAND circuit 38 of FIG. 5, but incorporates a transistor-based partial rectification stage 14B with transistor 34.

Transistor-based partial rectification stage 14B may be identical to partial rectification stage 14B of FIG. 3. As in the example of FIG. 5, a load capacitor may be coupled across output 20 in circuit 42 of FIG. 6. In addition, a filtering capacitor may be placed between the output of partial rectification 14B and ground, provided that the resulting capacitance is insufficient to produce a primarily dc power signal.

Figure 7:
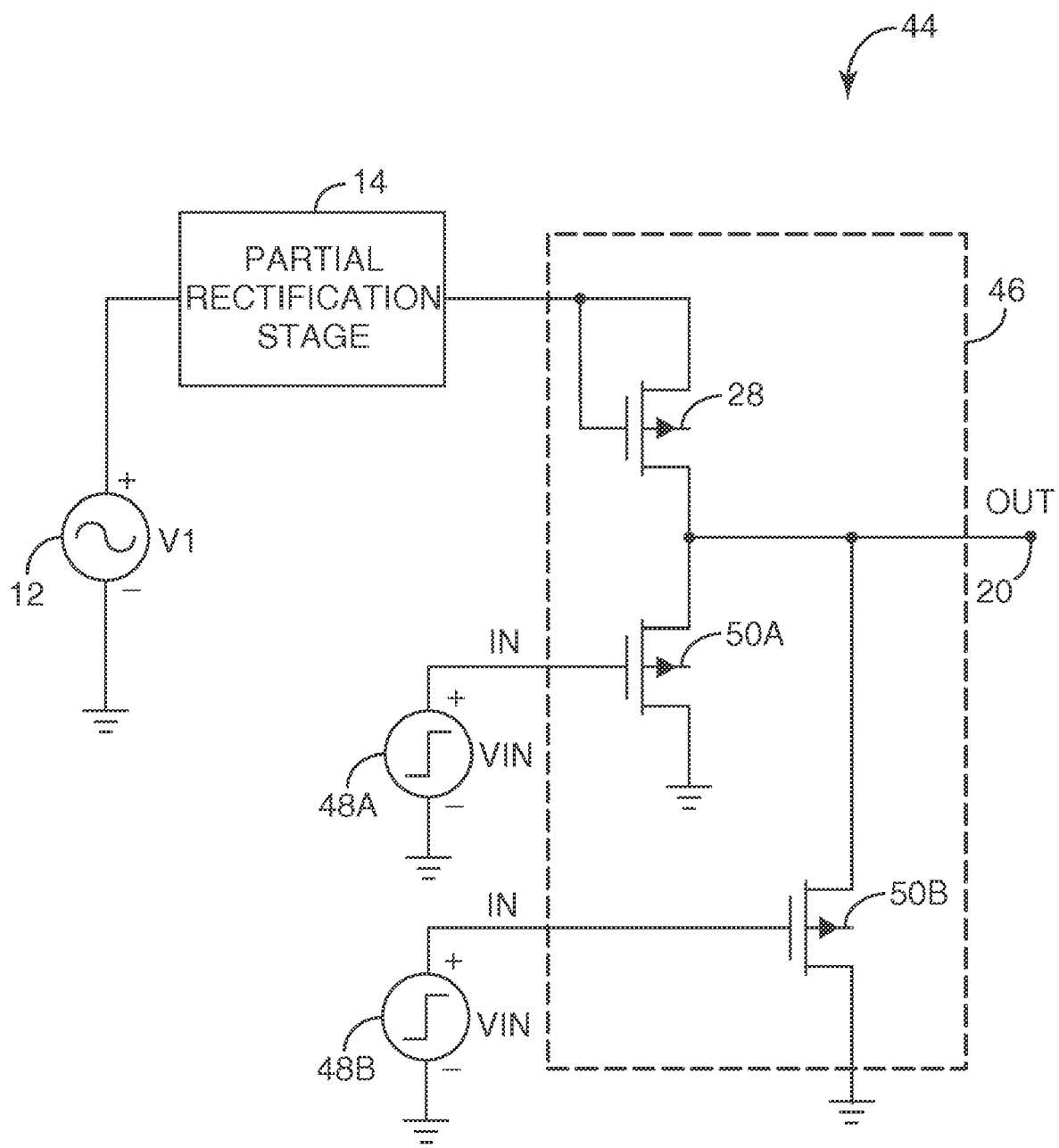
FIG. 7 is circuit diagram of a NOR gate circuit powered by a partially rectified ac waveform.

FIG. 7 is a circuit diagram illustrating a thin film transistor-based NOR gate circuit 44 with a NOR gate 46 powered by a partially rectified ac waveform. FIG. 7 represents another example of a thin film transistor-based logic circuit that operates with a partially rectified ac waveform produced by a partial rectification stage 14. As shown in FIG. 7, transistors 28, 50A, and 50B form NOR gate 46. The drains of first and second drive transistors 50A, 50B are coupled to the source of load transistor 28, and to output 20.

The sources of first and second drive transistors 50A, 50B are coupled to ground. First and second signal sources 48A, 48B drive the gates of drive transistors 50A, 50B, respectively. In response, NOR gate 46 produces a logical NOR output 20. NOR circuit 46 is operative in response to the partially rectified ac power waveform delivered by partial rectification stage 14. In some embodiments, a load capacitor may be coupled across logical NOR output 20. Again, the load capacitor may be formed independently or realized by the input capacitance of a logic gate driven by output 20 of NOR circuit 44.

Figure 8:
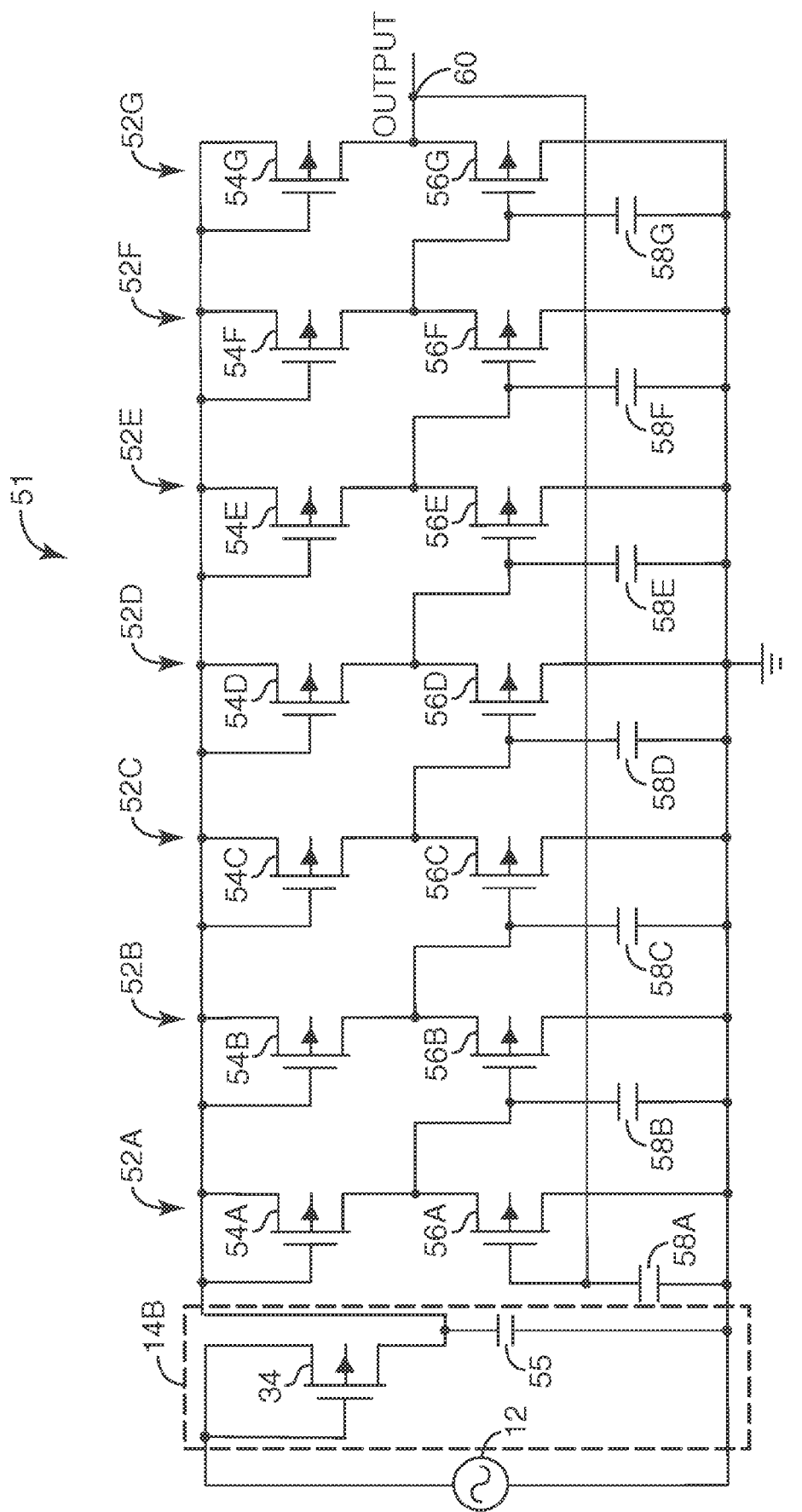
FIG. 8 is a circuit diagram illustrating a thin film transistor-based ring oscillator circuit powered by a partially rectified ac waveform generated by a half-wave transistor-based rectifier stage with a filtering capacitor.
Figure 9:
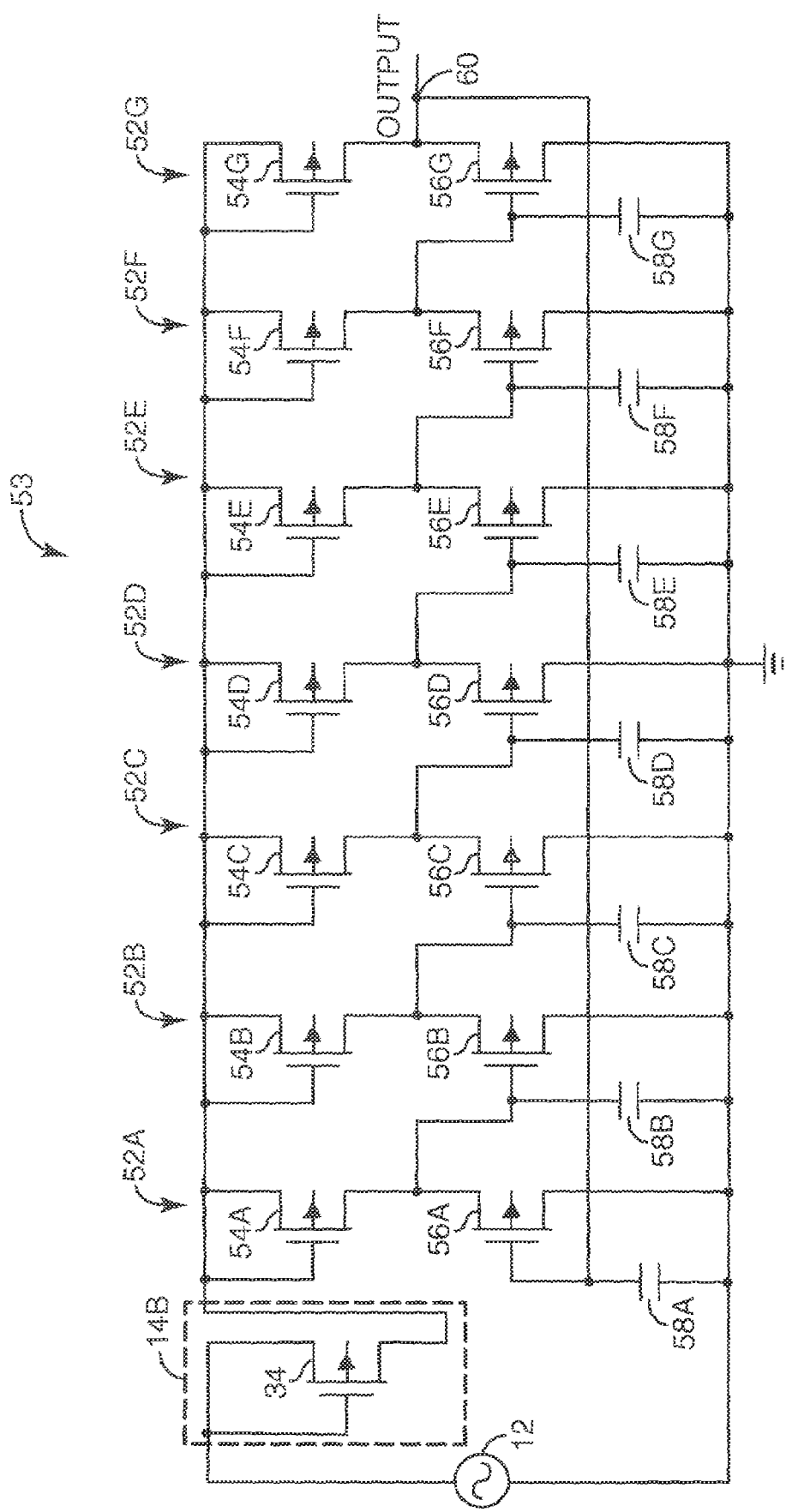
FIG. 9 is a circuit diagram illustrating a thin film transistor-based ring oscillator circuit powered by a partially rectified ac waveform generated by a half-wave transistor-based rectifier stage without a filtering capacitor.

FIGS. 8 and 9 are circuit diagrams illustrating ac-powered thin film transistor-based ring oscillator circuits 51, 53, respectively. Ring oscillator circuits 51 and 53 are examples of another circuit that can be implemented using logic gates powered by a partially rectified ac power waveform, e.g., including inverter stages based on OTFTs, which may be formed on flexible substrates. As shown in FIGS. 8 and 9, ring oscillator circuits 51 and 53 include an odd number of inverter stages arranged in series. In the example of FIGS. 8 and 9, ring oscillator circuits 51 and 53 include seven inverter stages 52A–52G having, respectively, load transistors 54A–54G and drive transistors 56A–56G, respectively.

Each transistor 54 and 56 in ring oscillator circuits 51 and 53 is a thin film field effect transistor powered by a partially rectified ac waveform. For example, ac power source 12 delivers ac power to partial rectification stage 14B. In the examples of FIGS. 8 and 9, partial rectification stage 14B is a transistor-based partial rectification stage, although a diode-based partial rectification stage or other configuration may be used. The source of transistor 34 in partial rectification stage 14B is coupled to drive the common gate-drain node of load transistor 54A in first inverter stage 52A. In the example of FIG. 8, a filtering capacitor 55 may optionally be provided in ring oscillator circuit 51A between the output of partial rectification stage 14B and ground. In FIG. 9, a filtering capacitor 55 is not provided in ring oscillator circuit 51B.

In the example of FIGS. 8 and 9, each inverter stage 52A–G has an output that is optionally coupled across a respective load capacitor 58A–58G. For example, the output of inverter stage 52A may be coupled across load capacitor 58B, and the output of inverter stage 52G may be coupled across load capacitor 58A. In other embodiments, load capacitors 58 may be omitted. Each capacitor 58 may be formed by the input capacitance produced by gate/source overlap within a drive transistor 56 of a subsequent inverter stage 52 that is driven by the output of a respective inverter stage.

The output 60 of final inverter stage 52G is coupled to the gate of drive transistor 56A in first inverter stage 52A to provide feedback. Ring oscillator circuit 51, 53 of FIGS. 8 and 9 operates in response to the partially rectified ac power supply waveform delivered by partial rectification stage 14B. During operation, ring oscillator circuit 51 provides a clock signal. For example, the output of each inverter stage 52 in ring oscillator circuit 51, 53 can be tapped to provide a clock signal with a desired phase.

In general, the output waveform produced by ring oscillator circuit 51, 53 will have a frequency that is dependent on the number of inverter stages 52 and the propagation delays produced by the individual inverter stages. The propagation delay is inversely related to the voltage of the partially rectified ac waveform applied to ring oscillator circuit 51, 53 and the mobility of the semiconducting material, and proportional to any applicable parasitic or external capacitance present in inverter stages 52.

Operation of thin film transistor circuitry, such as ring oscillator circuits 51, 53, may be possible with high ac power supply frequencies. Functioning ring oscillator circuits that conform substantially to circuits 51, 53 may operate, for example, with ac power supply frequencies on the order of several hundred kHz to 6 MHz or higher. With increased semiconductor mobility, it may be reasonable to expect use of ring oscillator circuits, powered by partially rectified ac power waveforms as described herein, with ac power supply frequencies of greater than 10 MHz.

Figure 10:
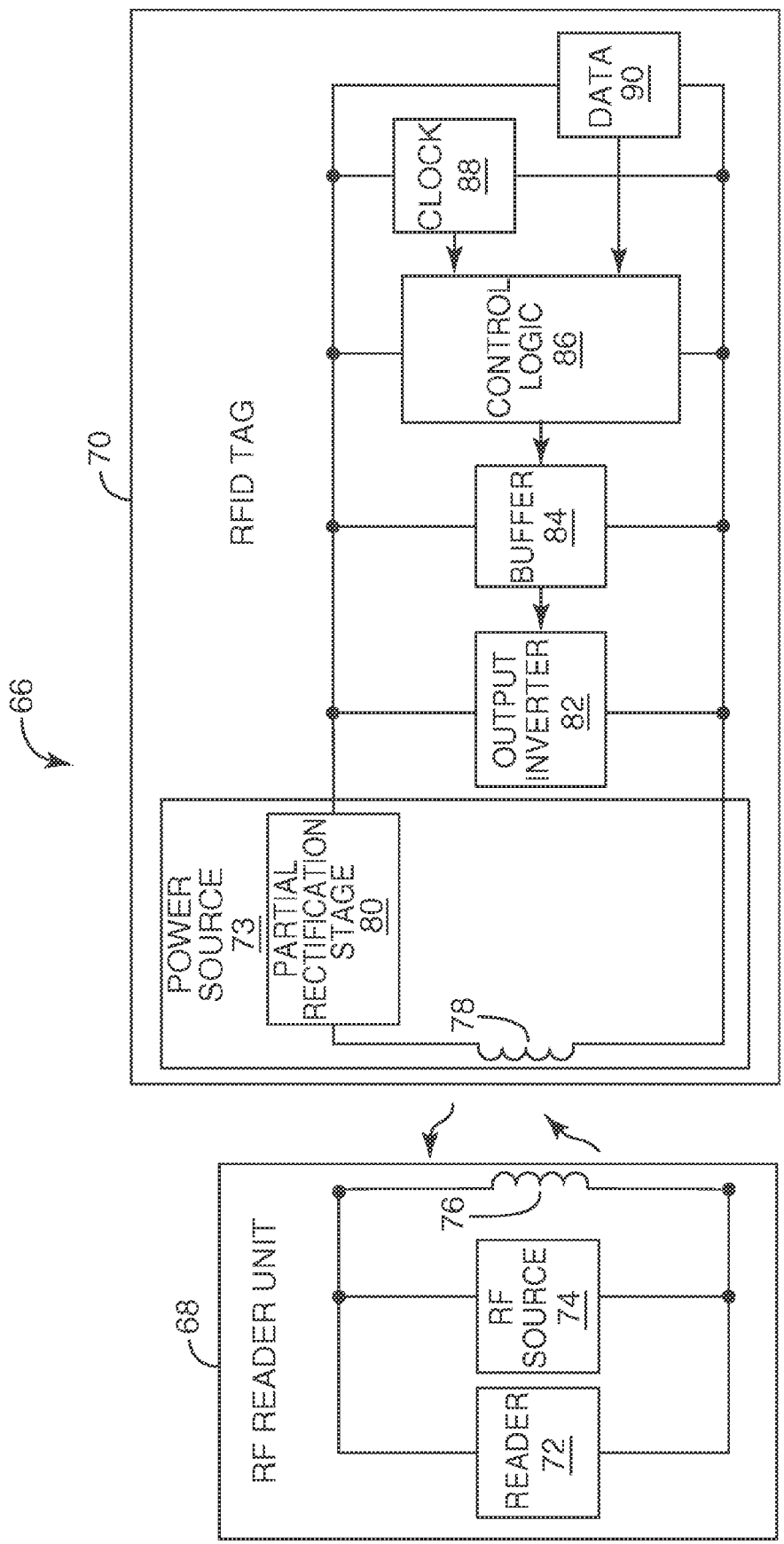
FIG. 10 is a block diagram illustrating application of ac-powered thin film transistor circuitry in an circuit/reader system.

FIG. 10 is a block diagram illustrating application of thin film transistor-based circuitry powered by a partially rectified ac power waveform in an circuit/reader system 66. Use of ac-powered thin film transistor-based circuitry may be particularly desirable in an circuit for a number of reasons, as will be described. As shown in FIG. 10, a circuit system 66 may include a reader unit 68 and an circuit 70.

Reader unit 68 may include a radio frequency (RF) source 74 and a reader 72. RF source 74 transmits RF energy to circuit 70 to provide a source of power. In this manner, circuit 70 need not carry an independent power supply, such as a battery. Instead, circuit 70 is powered across a wireless air interface between reader unit 68 and the circuit. To that end, reader unit 68 includes an inductor 76 that serves, in effect, as an antenna to transmit and receive RF energy.

As further shown in FIG. 10, circuit 70 may include an ac power source 73. As will be explained, ac power source 73 may serve to convert RF energy transmitted by reader unit 68 into ac power for delivery to thin film transistor circuitry carried by circuit 70. circuit 70 may receive the RF energy from reader unit 68 via an inductor 78 that serves as a receiver.

Inductor 78 serves as a radio frequency (RF) energy coupling device to provide an ac power waveform for ac power source 73 based on RF energy absorbed from RF energy transmitted by reader unit 68. A capacitor (not shown) also may be provided in parallel with inductor 78, if desired.

A partial rectification stage 80 receives an ac waveform from inductor 78 and produces a partially rectified ac waveform to power digital logic circuitry within circuit 70. circuit 70 further includes a modulation output inverter 82, an output buffer circuit 84, control logic 86, clock circuit 88 and data circuit 90, one or more of which may be formed by an arrangement of thin film transistor circuitry.

Clock 88 drives control logic circuit 86 to output data from data circuit 90, which may comprise a plurality of data lines carrying an identification code. Output buffer 84 buffers the output from control logic 86. Modulation inverter 82, in turn, modulates the buffered output for interpretation by reader unit 68 via inductors 76, 78. For example, modulation inverter 82 conveys the information by modulating the signal applied across inductor 78.

Figure 11:
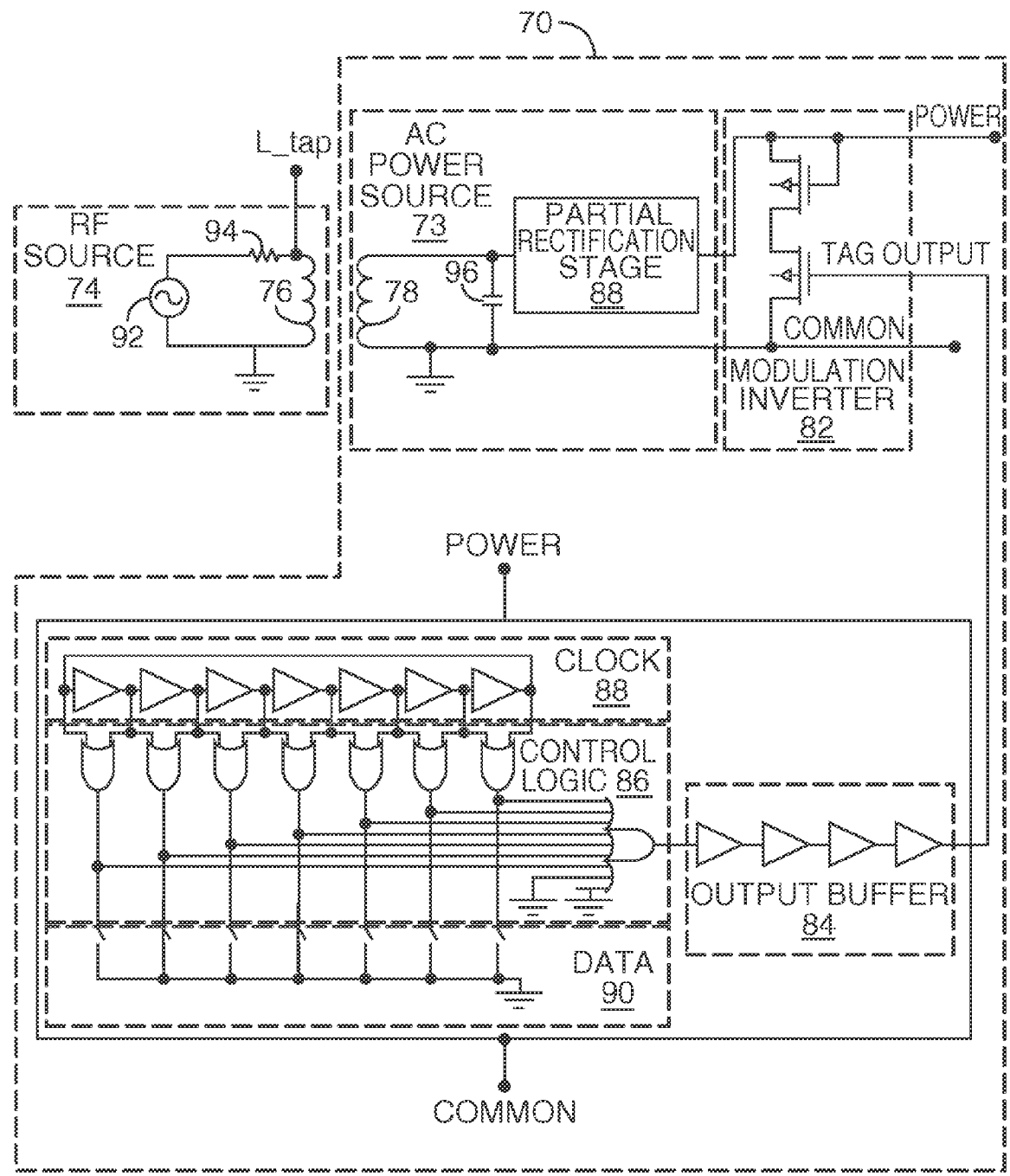
FIG. 11 is a circuit diagram further illustrating the circuit/reader system of FIG. 10.

FIG. 11 is a circuit diagram further illustrating the circuit/reader system 66 of FIG. 10. As shown in FIG. 11, RF source 74 may include an ac generator 92 that transmits an ac output signal via inductor 76. For some applications, ac generator 92 may take the form of a sinusoidal current source with an output of approximately 0 to 5 amps at a frequency of approximately 125 kHz.

Inductors 76 and 78 form a transformer for electromagnetic coupling of RF energy between RF source and circuit 70. Resistor 94 is selected to limit current. A capacitor 96 may be placed in parallel with inductor 78 within power source 73 to form a parallel resonant tank that governs the frequency of the power source according to the equation:

$$f = \frac{1}{2\pi\sqrt{LC}},$$

where L is the inductance of inductor 78 and C is the capacitance of capacitor 96.

With an inductance of 50 μH and a capacitance of 32 nF, inductor 78 and capacitor 96 generate a resonant frequency of approximately 125 KHz. Hence, in this example, the output of ac power source 73 is a sinusoidal waveform with a frequency of approximately 125 kHz. This waveform produced by inductor 78 is partially rectified by partial rectification stage 80 to produce a partially rectified ac power waveform as the output of power source 73. The partially rectified ac power waveform is then applied to clock circuit 88, control logic 86, data lines 90, output buffer 84, and modulation inverter 82 as represented in FIG. 11 by the terminals POWER and COMMON.

FIG. 11 depicts an circuit 70 that carries an n-bit identification code. For ease of illustration, circuit 70 carries a 7-bit identification code specified by data lines 70. In many applications, circuit 70 may carry a much larger identification code, e.g., 31-bit, 63-bit or 127-bit codes. In some embodiments, selected data lines 90 may carry information used for start bit identification, data stream synchronization and error checking. In the example of FIG. 11, clock circuit 88 is a ring oscillator formed by a series of seven inverter stages arranged in a feedback loop.

The ring oscillator of FIG. 11 may be similar to ring oscillator 51 or 53 of FIGS. 8 and 9. The outputs of two successive inverters are applied to a respective NOR gate provided in control logic 86. In this way, seven NOR gates are used to generate a sequence of seven pulses within each clock cycle produced by the ring oscillator. Note that the number of NOR gates in control logic 86 may vary. Again, this arrangement could be extended, in principle, to larger numbers of bits, e.g., n=31, 63 or 127.

Switches shown in series with data lines 90 are connected to respective NOR gate outputs at one end. If a switch is closed, the respective data line couples the NOR gate output to ground If the switch is open, the NOR gate output is coupled as one of the inputs to a 7-input OR gate within control logic 86.

In the example of FIG. 11, the switches for second and fourth data lines (from left to right) are closed. As a result, data lines 90 store the 7-bit identification code "1010111." The switches can be made, for example, from metal lines that extend from the NOR gate outputs to ground. The electrical connections to ground can be intentionally broken or connected during manufacturing to produce, in effect, an open switch, and thereby encode a unique identification code into data lines 90 of circuit 70. The electrical connections may be broken by a variety of manufacturing techniques such as, for example, laser etching, mechanical scribing, or electrical fusing.

The output of the 7-input OR gate in control logic 86 is applied to a cascade of buffer amplifiers in output buffer 84 to help match the output impedance of the logic circuitry to the input impedance of the modulation inverter 82. The output of the buffer amplifiers in output buffer 84 is applied to the input of the modulation inverter 76. Specifically, the signal TAG OUTPUT is applied to the gate of the drive transistor associated with modulation inverter 82. Modulation inverter 82 then modulates the Q of the tank formed by inductor 78 and capacitor 96 to provide amplitude modulation of the carrier signal. In this manner, the received buffer output is conveyed to reader unit 68 so that reader 72 can read the identification code. In particular, reader 72 processes the signal received at L_tap via inductor 76.

Figure 12:
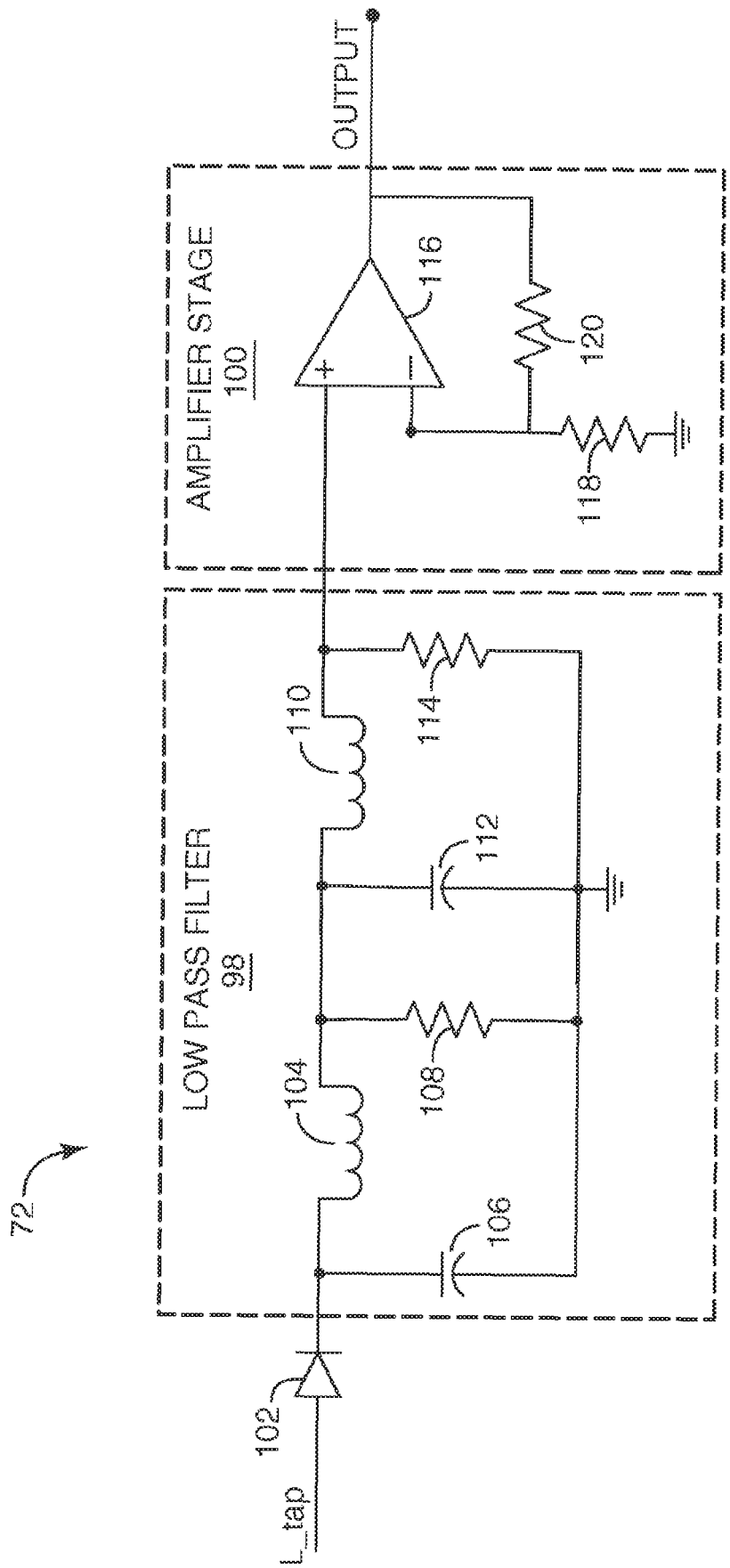
FIG. 12 is a circuit diagram further illustrating a reader associated with the circuit/reader system of FIG. 10.

FIG. 12 is a circuit diagram further illustrating reader 72 associated with the circuit/reader system 68 of FIG. 10. Reader 72 receives, via L_tap, a signal containing the carrier signal, e.g., at 125 kHz, modulated by the TAG OUTPUT signal, which may be on the order of 1 kHz, depending on the frequency of clock circuit 88. A low junction capacitance signal diode 102 is used to demodulate the signal. A low pass filter section 98 removes the carrier frequency, and may include inductor 104, capacitor 106, resistor 108, inductor 110, capacitor 112 and resistor 114. An amplifier stage 100 includes an amplifier 116 in a non-inverting configuration, with resistor 118 and feedback resistor 120 coupled to the inverting input.

Figure 13:
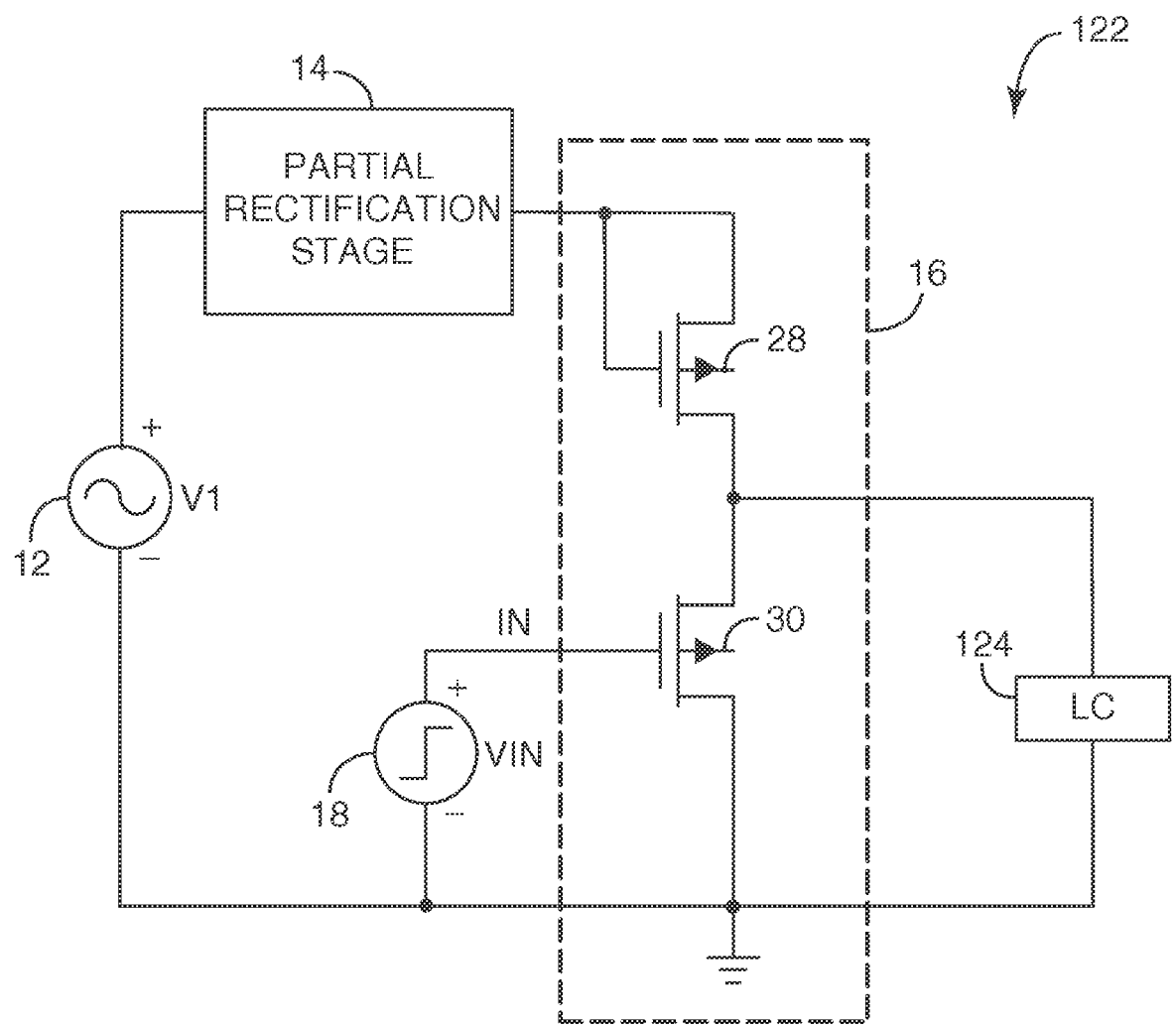
FIG. 13 is a circuit diagram illustrating an inverter circuit powered by a partially rectified ac waveform to drive a liquid crystal display element.

FIG. 13 is a circuit diagram illustrating a thin film transistor-based inverter circuit 122 that is powered by a partially rectified ac power waveform to drive a liquid crystal (LC) display element 124. In the example of FIG. 13, inverter circuit 122 conforms substantially to inverter circuit 16A of FIGS. 2 and 3. However, the output of inverter 16 drives a liquid crystal display element 124. In particular, one electrode of liquid crystal display element 124 is coupled to the source of load transistor 28 and the drain of drive transistor 30. The other electrode of liquid crystal display element 124 is coupled to ground. As shown in FIG. 13, inverter circuit 16 is powered by partial rectification stage 14, and therefore receives at the common gate/drain connection of load transistor 28, a partially rectified ac power waveform. In order to drive a full LCD, an inverter similar to inverter 16 may be provided for each element of the LCD.

Figure 14:
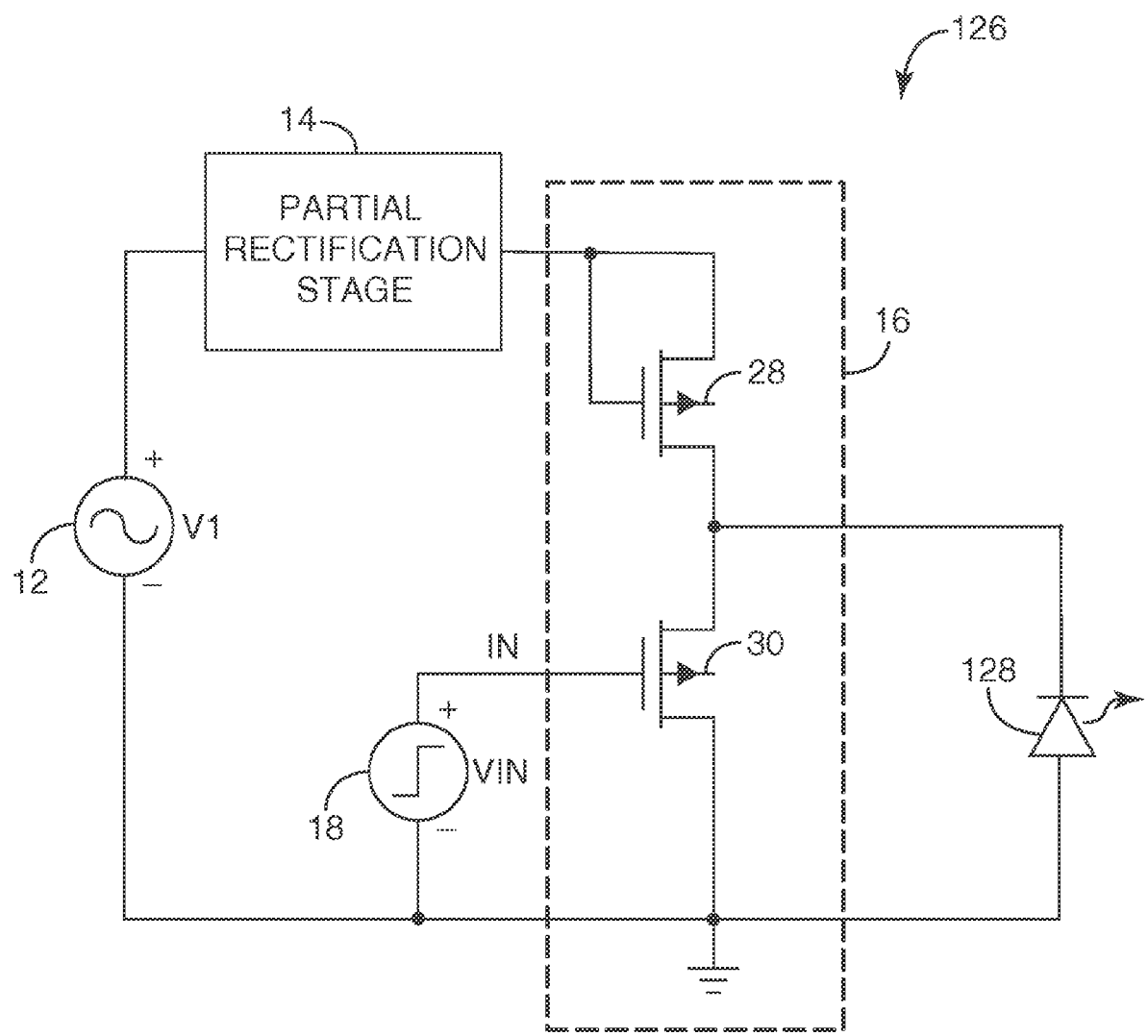
FIG. 14 is a circuit diagram illustrating an inverter circuit powered by a partially rectified ac waveform to drive a light emitting diode (LED).

FIG. 14 is a circuit diagram illustrating an ac-powered thin film transistor-based inverter circuit 126 that drives a light emitting diode (LED) 128. Inverter circuit 16 conforms substantially to inverter circuit 16A of FIGS. 2 and 3, but drives an LED 128. The cathode of LED 128 is coupled to the source of load transistor 28 and the drain of drive transistor 1308, and the anode of the LED is coupled to ground.

The invention can provide a number of advantages. For example, logic circuitry powered by a partially rectified ac waveform, and particularly OTFT-based logic circuitry, may exhibit satisfactory performance relative to dc-powered thin film transistor circuitry. In the case of a ring oscillator, for example, thin film transistor circuitry powered by a partially rectified ac waveform may maintain satisfactory oscillation amplitudes relative to dc-powered thin film transistor circuitry.

As an advantage, the use of a partially rectified ac power waveform to directly power logic circuitry may eliminate the need for a full wave rectifier component or half-wave rectifier component with a filtering capacitor otherwise required in many applications for delivery of dc power to the circuitry. Accordingly, by eliminating the need for a conventional rectifier component, the use of partially rectified ac power may reduce the manufacturing time, expense, cost, complexity, and size of components carrying thin film transistor circuitry.

For circuits, as a particular example, the use of ac-powered thin film circuitry may substantially reduce the cost and size of the tag by eliminating much of the components typically associated with an ac-dc rectifier stage, including diode or transistor bridges, and large filtering capacitors. By reducing the complexity of the rectifier stage, thin film logic circuitry powered by a partially rectified ac waveform can result in substantial cost and size savings in the design and manufacture of the circuit.

Thin film transistors useful in forming logic circuitry powered by a partially rectified ac waveform, as described herein, may take a variety of forms and may be manufactured using various manufacturing processes. For example, the thin film transistors may include organic semiconducting material, inorganic semiconducting material, or a combination of both. For some applications, organic and inorganic semiconducting materials can be used to form CMOS thin film transistor circuitry.

Thin film transistors useful in forming logic circuitry powered by a partially rectified ac waveform as described herein may include, without limitation, thin film transistors manufactured according to the techniques described in U.S. Pat. Nos. 6,433,359 and 6,616,609;U.S. Patent Publication No. 2003/0207505, published Nov. 6, 2003; U.S. patent application Ser. No. 10/012,654, filed Nov. 2, 2001, U.S. patent application Ser. Nos. 10/076,003, 10/076,174 and 10/076,005 all filed Feb. 14, 2002, and U.S. patent application Ser. No. 10/094,007, filed Mar. 7, 2002, the entire content of each is incorporated herein by reference.

Various modification may be made without departing from the spirit and scope of the invention. For example, although specific examples of partial rectification stages have been described, other partial rectification stages may be provided to achieve similar partial rectification results. Moreover, a variety of logic circuitry may benefit from the use of a partially rectified waveform to power the logic circuitry. Accordingly, the examples described herein should not be taken as limiting of the scope of the invention. These and other embodiments are within the scope of the following claims.

The invention claimed is:

1. A radio frequency identification (RFID) tag comprising:
a first and second transistors arranged to form a logic gate, a radio frequency (RF) converter that converts RF energy to an alternating current (ac) power waveform, a partial rectification stage to produce a partially rectified ac power waveform from the ac power waveform and directly power the logic gate with the partially rectified ac power waveform, wherein peaks of half-cycles of the partially rectified ac power waveform have sufficient voltages to power the logic gate, the partial rectification stage produces an average direct current (dc) voltage that is insufficient to power the logic gate, and the ac power waveform has a period less than a propagation delay of the logic gate.

2. The circuit of claim 1, wherein the partial rectification stage includes an output filtering capacitor.

3. The circuit of claim 1, wherein the partial rectification stage does not include an output filtering capacitor.

4. The circuit of claim 1, wherein the partial rectification stage includes a half-wave rectifier with insufficient capacitive filtering to produce a primarily direct current (dc) power signal as the partially rectified ac power waveform.

5. The circuit of claim 1, wherein the partial rectification stage includes a transistor-based rectifier.

6. The circuit of claim 1, wherein the partial rectification stage includes a diode-based rectifier.

7. The circuit of claim 1, wherein the logic gate includes one of an inverter, a NOR gate, and a NAND gate.

8. The circuit of claim 1, wherein the logic gate forms an analog amplifier.

9. The circuit of claim 1, further comprising a display element, wherein the logic gate is coupled to drive the display element.

10. The circuit of claim 1, wherein the circuit includes a series of inverter stages, the inverter stages being coupled to form at least part of a ring oscillator.

11. The circuit of claim 1, wherein at least one of the transistors is an organic thin film transistor.

12. The circuit of claim 1, wherein the semiconductor material of at least one of the transistors is one of pentacene, zinc oxide, polysilicon or amorphous silicon.

13. The circuit of claim 1, wherein the first transistor is an n-channel transistor and the second transistor is a p-channel transistor.

14. The circuit of claim 1 wherein at least one of the transistors is an inorganic thin film transistor.

15. A radio frequency identification (RFID) system comprising:
a) the RFID tag of claim 1, and
b) an RFID reader that transmits RF energy to the RFID tag for conversion by said RF convertor, and reads the information conveyed by said modulator.

* * * * *